(12) United States Patent
Mechler (10) Patent No.: US 12,366,231 B2
(45) Date of Patent: Jul. 22, 2025

(54) BUOYANT COMPRESSED AIR ENERGY STORAGE

(71) Applicant: Black & Veatch Holding Company, Overland Park, KS (US)

(72) Inventor: Mason Charles Mechler, Lawrence, KS (US)

(73) Assignee: BLACK & VEATCH CORPORATION, Overland Park, KS (US)

( * ) Notice: Subject to any disclaimer, the term of this patent is extended or adjusted under 35 U.S.C. 154(b) by 0 days.

(21) Appl. No.: 18/754,470

(22) Filed: Jun. 26, 2024

(65) Prior Publication Data

US 2025/0003397 A1     Jan. 2, 2025

Related U.S. Application Data (60) Provisional application No. 63/511,215, filed on Jun. 30, 2023.

(51) Int. Cl.
*F03G 7/00* (2006.01)
*F03B 17/02* (2006.01)
*F15B 1/027* (2006.01)
*F15B 1/04* (2006.01)

(52) U.S. Cl.
CPC ............ *F03G 7/008* (2021.08); *F03B 17/025* (2013.01); *F15B 1/027* (2013.01); *F15B 1/04* (2013.01)

(58) Field of Classification Search
CPC ......... F03B 17/02; F03B 17/025; Y02E 10/20
See application file for complete search history.

(56) References Cited

U.S. PATENT DOCUMENTS

| 3,961,479 | A | * | 6/1976 | Anderson | F03B 17/025 60/496 |
| 4,726,188 | A | * | 2/1988 | Woolfolk | F03B 17/025 417/337 |
| 5,430,333 | A | * | 7/1995 | Binford | F03G 7/06 60/527 |

(Continued)

FOREIGN PATENT DOCUMENTS

| CN | 107559146 | 1/2018 |
| CN | 114352464 | 4/2022 |

(Continued)

OTHER PUBLICATIONS

International Search Report and Written Opinion in related PCT Application PCT/US2024/035824 mailed Oct. 31, 2024, 11 pages.

*Primary Examiner* — Michael Leslie
(74) *Attorney, Agent, or Firm* — HOVEY WILLIAM LLP (57) ABSTRACT

An energy storage system includes a pneumatic vessel, a cable system attached to the vessel, a compressor for pressurizing the vessel, a generator attached to the cable system, a turboexpander generator for receiving compressed air from the vessel, and a control system. The system deflates and allows the vessel to sink in a body of water, inflates the vessel to store energy when an abundance of it exists, and allows the inflated vessel to resurface to release its buoyant energy to the generator via the cable system and to release compressed air to the turboexpander generator to generate electricity when electricity demand is high and/or electricity generation from other sources is low.

20 Claims, 6 Drawing Sheets

(56) References Cited

U.S. PATENT DOCUMENTS

| | | | | |
|---|---|---|---|---|
| 6,009,707 | A * | 1/2000 | Alkhamis | F03B 17/02 |
| | | | | 60/507 |
| 7,969,033 | B2 * | 6/2011 | Ryan | F03B 17/04 |
| | | | | 60/497 |
| 9,045,209 | B2 | 6/2015 | Zeren et al. | |
| 9,059,605 | B2 | 6/2015 | Murray et al. | |
| 9,139,974 | B2 | 9/2015 | Frazier et al. | |
| 9,410,559 | B2 | 8/2016 | Vanwalleghem et al. | |
| 9,777,708 | B2 * | 10/2017 | Risager | F03D 7/0224 |
| 9,784,413 | B2 | 10/2017 | Lewis et al. | |
| 9,926,905 | B2 * | 3/2018 | Fernandez | F04D 25/02 |
| 9,938,896 | B2 | 4/2018 | Bannari | |
| 9,939,112 | B2 | 4/2018 | Lewis et al. | |
| 10,072,646 | B2 | 9/2018 | Enis et al. | |
| 10,364,938 | B2 | 7/2019 | Frazier et al. | |
| 10,655,505 | B2 | 5/2020 | Matsukuma et al. | |
| 11,286,898 | B2 | 3/2022 | Novek | |
| 2008/0136186 | A1 | 6/2008 | Gogoana et al. | |
| 2009/0021012 | A1 | 1/2009 | Stull et al. | |
| 2010/0107627 | A1 | 5/2010 | Morgan | |
| 2012/0060489 | A1 | 3/2012 | Rizzi | |
| 2016/0344259 | A1 * | 11/2016 | Stevens | F03B 17/02 |

FOREIGN PATENT DOCUMENTS

| | | |
|---|---|---|
| CN | 114382637 | 4/2022 |
| CN | 115013245 | 9/2022 |
| CN | 111120208 | 11/2023 |
| DE | 102014117018 | 10/2018 |
| JP | 2006029277 | 2/2006 |
| JP | 2014111919 | 1/2014 |
| KR | 101049518 | 7/2011 |

* cited by examiner

BUOYANT COMPRESSED AIR ENERGY STORAGE

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/511,215; titled "BUOYANT COMPRESSED AIR ENERGY STORAGE"; and filed Jun. 30, 2023. The Provisional Application is hereby incorporated by reference, in its entirety, into the current patent application.

BACKGROUND OF THE INVENTION

Renewable energy sources such as wind and solar plants continue to supplement and replace fossil fuel fired generators. But because renewable energy sources are intermittent, energy storage is often needed to meet electricity demands when renewables produce less electricity. Many different energy storage technologies have been implemented to meet these needs, but all have limitations.

For example, large scale batteries are often built alongside renewable energy sources to store electricity when it's abundant and release it to an electric grid when it's needed. But batteries are very expensive to manufacture and maintain, create environmental problems when fabricated and disposed, and suffer energy losses when storing electricity for long periods of time.

Gravitational energy storage systems, which store energy by utilizing the force of gravity to lift heavy objects to a higher position when excess energy is available and then release them to generate electricity when the energy is needed, don't have the same environmental issues as batteries, but they require lots of space, materials, and labor to construct and operate and therefore aren't suitable for many energy storage needs.

Compressed air energy storage (CAES) systems, which store energy in the form of compressed air when excess energy is available and then release the air to spin a generator when the energy is needed, also don't have the same environmental issues as batteries, but they also require lots of space, materials, and labor to construct and operate and therefore aren't suitable for many energy storage needs.

SUMMARY OF THE INVENTION

The present invention solves the above-described problems related to existing energy storage technologies and provides a distinct advance in the art of energy storage by providing systems and methods to cost effectively store large amounts of energy for long periods of time and to deploy the stored energy quickly and easily when it is needed. Embodiments of the invention effectively pair two energy storage technologies: compressed air energy storage (CAES) and gravitational storage. An important aspect of the invention is that it employs a compressible pneumatic vessel that serves as both a CAES vessel and a gravitational storage mechanism. The pneumatic vessel holds and releases compressed air and is also allowed to sink in a body of water before it is inflated to create buoyant energy that can be recovered at no additional power input, greatly supplementing the energy recovery of a CAES system.

One embodiment of the invention is an energy storage system broadly comprising: a pneumatic vessel, a cable system, a compressor, a generator, a turboexpander generator, and a control system. The energy storage system is installed and operated alongside a body of water such a lake, river, ocean, or manmade pond and may be electrically connected to an electric grid or energy source such as a solar energy farm or wind energy farm.

The pneumatic vessel may be a large flexible bladder or any other device that can be inflated with air or other gas and deflated to a substantially compressed state. The vessel may be of any size and volume to accommodate any storage requirements.

The cable system is attached to the vessel and is operable to manage the cabling and to guide the vessel as it is deflated and descending within the body of water due to gravity, hold the vessel underwater while and after it has been inflated, and allow the inflated vessel to rise toward a surface of the body of water, all under the direction of the control system. In one embodiment, the cable system comprises a pulley anchored beneath the body of water; a cable trained over the pulley and attached to the vessel; and a motor-driven pulley or winch connected to the cable to manage the sinking or submergence of the vessel in the body of water and allowing the vessel to rise toward the surface of the body of water at a controlled rate. The motor may also operate as a generator.

The compressor is pneumatically coupled with the vessel for inflating the vessel under the direction of the control system. The compressor may also operate in reverse to deflate the vessel and/or may be coupled with other pneumatic vessels as described herein.

The generator is operatively coupled with the cable system such that its rotor or other associated component spins to generate electricity when the cable system releases the inflated vessel to rise in the body of water. The generator may also be directly or indirectly coupled with an electrical grid to deliver electricity to the grid.

The control system operates or otherwise controls the other components of the energy storage system to store energy when an abundance of it exists and to release the energy to generate electricity when electricity demand is high and/or electricity generation from other sources is low. The control system may include a manually operated user interface that receives inputs from an operator or may include automated programming or circuitry.

In one embodiment, the control system operates the cable system to allow the vessel to sink in the body of water when the vessel is in its deflated or compressed state. When an abundant supply of excess or inexpensive electricity exists, the control system operates the compressor to inflate the submerged vessel with air of other gas and holds the inflated vessel beneath the body of water until energy is needed. When energy is needed, the control system operates the cable system to release the inflated vessel so it rises in the body of water at a controlled rate. As the inflated vessel rises, the attached cable spins the generator to generate electricity.

Embodiments of the energy storage system may further comprise a control valve coupled with the vessel and a separate control valve coupled with a turboexpander generator to receive gas from the vessel. In these embodiments, the control system operates the control valve to expel gas from the vessel to the turboexpander generator as the inflated vessel rises in the body of water. This creates additional electricity that may be delivered to the electric grid and also manages pressures exerted on the vessel.

Embodiments of the energy storage system may further comprise a thermal energy storage and thermal management system to store the heat of compression during inflation of the vessel. The thermal energy storage system may consist of various storage methods such as packed bed, heated fluid, thermal mass or other similar system. The stored thermal energy would then be recovered from the thermal storage system to heat the expelled gas from the vessel prior to expansion in the turboexpander generator to improve efficiency and to ensure acceptable gas temperatures are maintained during the expansion process. Additionally, external heat sources (e.g., combustion via natural gas, hydrogen, or other alternative fuel, low value or waste heat sources, thermal storage from renewable energy applications or process applications) could be incorporated to raise the gas temperature prior to expansion.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF DRAWINGS

Embodiments of the present invention are described in detail below with reference to the attached drawing figures. The drawing figures do not limit the present invention to the specific embodiments disclosed and described herein. The drawings are not to scale, emphasis instead being placed upon clearly illustrating the principles of the invention.

DETAILED DESCRIPTION OF THE INVENTION

The present invention includes systems and methods for cost effectively storing large amounts of energy for long periods of time and quickly and cost-effectively deploying the stored energy when it is needed. As shown in FIGS. 1-4, embodiments of the invention may be implemented with an energy storage system 10 that is installed and operated alongside a body of water 12 such as a lake, river, ocean, flooded mineshaft, or manmade pond to name a few. The energy storage system 10 is connected to an electric grid 14 with suitable transmission lines to provide electricity to and receive electricity from the grid.

Figure 6:
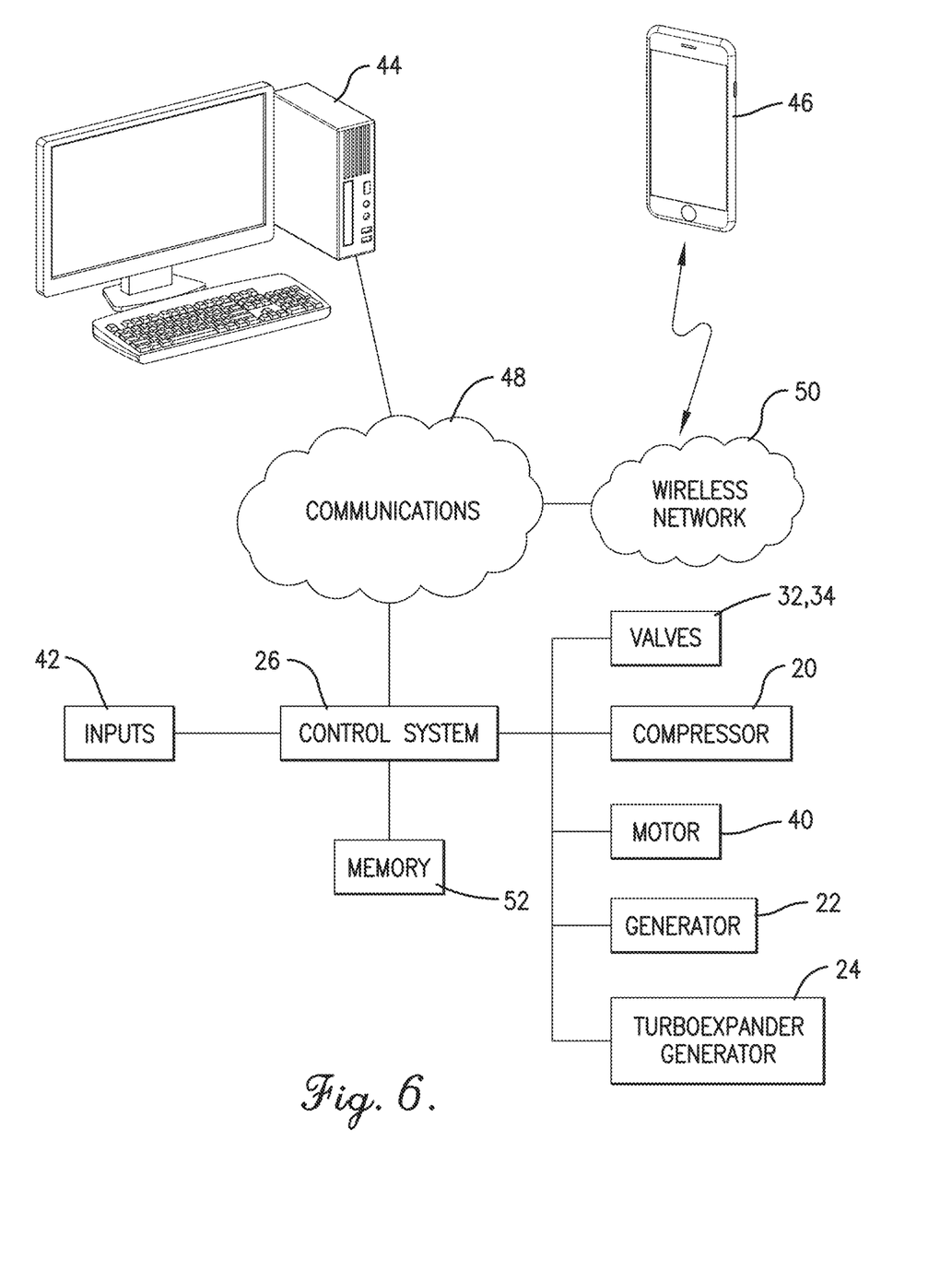
FIG. 6 is a block diagram showing exemplary components in a computer and communications network that may implement aspects of the present invention.

As shown, an embodiment of the energy storage system 10 comprises: a pneumatic vessel 16, a cable system 18, a compressor 20, a generator 22, a turboexpander generator 24, and a control system 26 (FIG. 6). The energy storage system 10 may utilize any number of these components to store and release energy, but for simplification, only one of each will be described in detail herein.

The pneumatic vessel 16 may be any device that can be inflated with air or other gas and deflated to a substantially compressed state. One embodiment of the vessel is a large flexible bladder formed of rubber of other flexible air-impervious materials. The vessel may be of any size and volume to accommodate any storage requirements. Because the vessel 16 is allowed to sink in the body of water when fully deflated, vessel design challenges associated with traditional CAES are removed. With traditional CAES systems, the air storage vessel must be strong enough to contain the pressure of its enclosed compressed gas. With the present invention, the vessel only must withstand the differential pressure between the water column and the internal gas pressure. Thus, in some embodiments, the vessel can be very thin-walled if sunk deep enough and the differential pressure is managed as it rises. The vessel naturally sinking underwater allows it to withstand a linearly increasing pressure compared to what it could contain at the surface.

Figure 2:
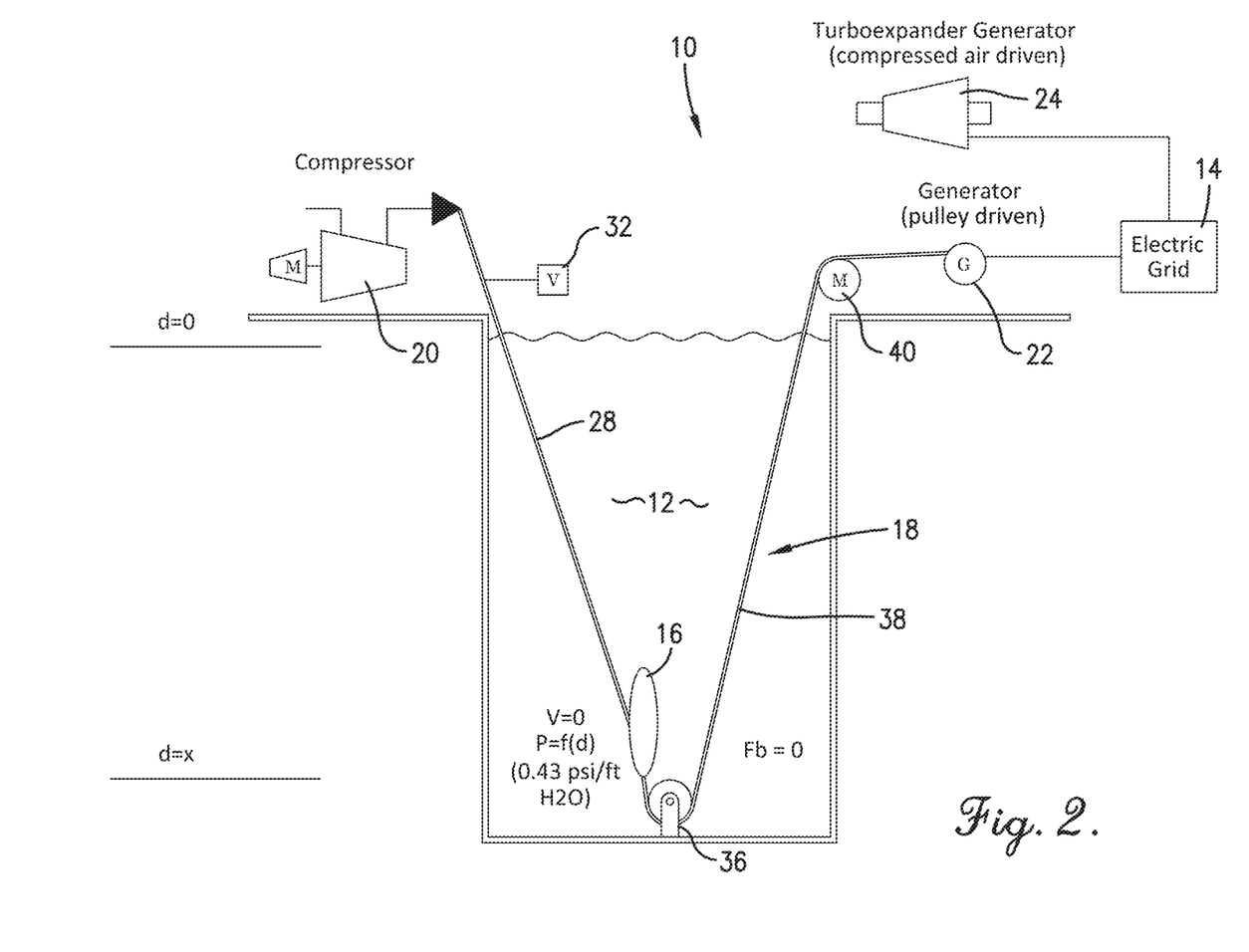
FIG. 2 is another schematic diagram of the energy storage system of FIG. 1 with its vessel deflated and submerged beneath the body of water.
Figure 4:
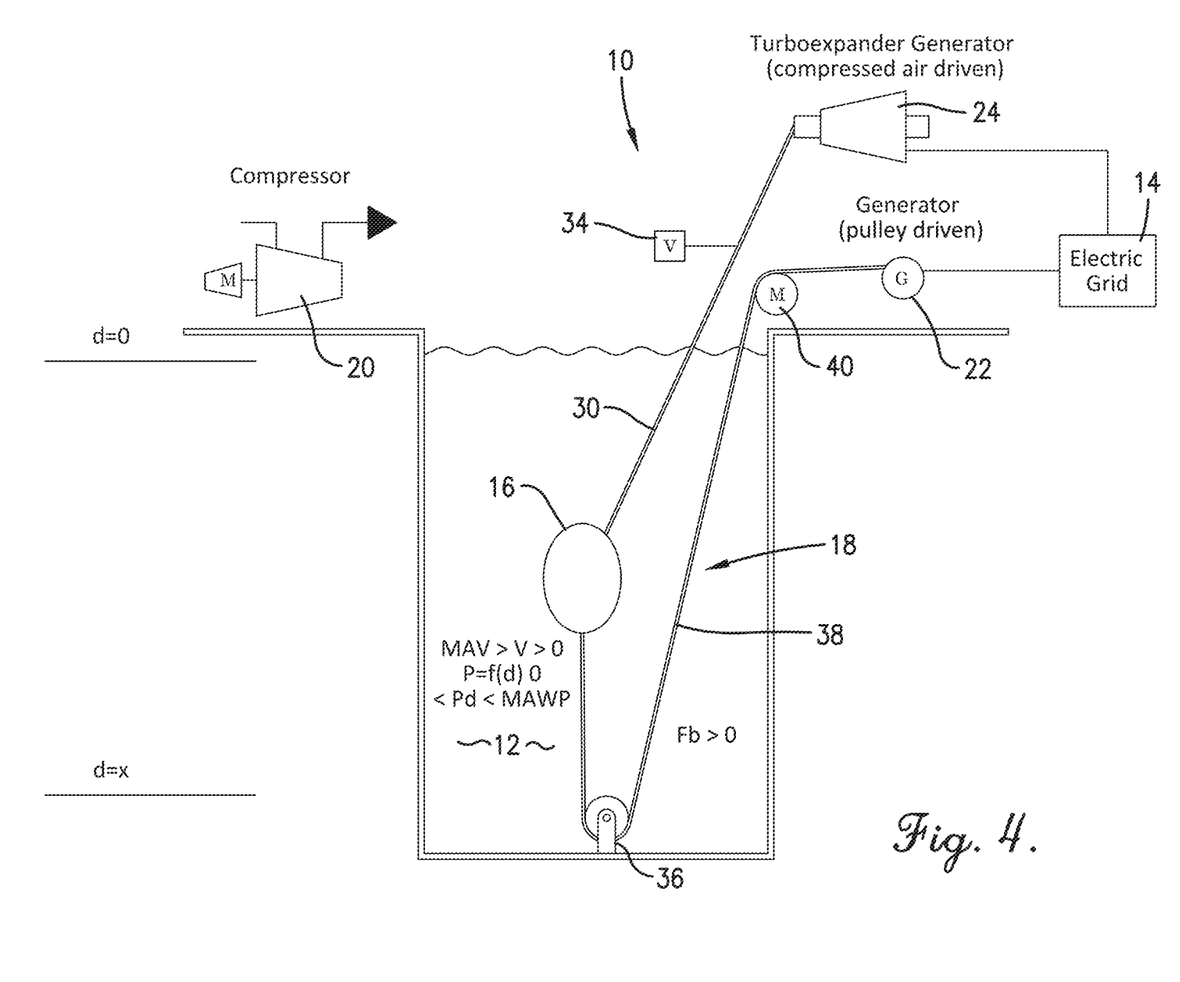
FIG. 4 is another schematic diagram of the energy storage system of FIG. 1 with its vessel shown rising in the body of water and being deflated as it rises.

As shown in FIG. 2, the energy storage system 10 also comprises pneumatic piping or tubing 28 between the vessel 16 and the compressor 20 for delivering pressurized air or other gas from the compressor to the vessel, and as shown in FIG. 4, pneumatic piping or tubing 30 between the vessel 16 and the turboexpander generator 24 for releasing pressurized air or other gas from the vessel to the generator. Valves 32, 34 are disposed in the vessel 16 or the pneumatic piping 28, 30 to control the delivery and discharge of gas to and from the vessel.

The cable system 18 is attached to the vessel 16 and is operable to facilitate sinking of the vessel in the body of water and to allow it to rise in the body of water under the direction of the control system 26. The cable system is also operatively coupled to power the generator 22 when the vessel rises as discussed in more detail below.

In one embodiment, the cable system 18 comprises a pulley 36 anchored in the floor of the body of water 12; a cable 38 trained over the pulley attached to the vessel and generator 22, and a motor-driven pulley 40 or winch connected to the cable for moving the cable in one direction to allow the vessel to sink and in an opposite direction to allow the vessel to rise toward the surface of the body of water.

The compressor 20 may be any device that can deliver pressurized air or other gas to the vessel 16 via the tubing 28 under the direction of the control system. The compressor 20 may also operate in reverse to deflate the vessel and/or may be coupled with other pneumatic vessels as described herein. In one embodiment, the air compressor is sized for a slightly higher discharge pressure than the corresponding water column pressure at the depth the vessel will be held in the body of water.

The generator 22 may be any device that can convert mechanical energy to electricity and in one embodiment is a pulley driven generator. The generator is operatively coupled with the cable system 18 such that its rotor or other associated component spins to generate electricity when the inflated vessel 16 rises in the body of water and pulls on the cable 38 attached to the vessel. The generator is directly or indirectly coupled with the electric grid 14 as shown to deliver electricity to the grid.

The turboexpander generator 24 may be any device that can convert pressurized air or other gas to electricity and in one embodiment is a compressed air driven turbine expander type generator. The turboexpander generator 24 is coupled with the tubing 30 and the control valve 34 for receiving gas from the vessel when the vessel is deflated as it rises toward the surface of the body of water.

The control system 26 operates or otherwise controls components of the energy storage system 10 to store energy when an abundance of it exists and to release the energy to generate electricity when electricity demand is high and/or electricity generation from other sources is low. An embodiment of the control system 26 is shown in FIG. 6 along with other computer and communications equipment that may provide data to and receive data from the control system. As shown, the control system receives data, information, and instructions from inputs 42, such as a user interface or other input devices and controls or otherwise provides instructions to the valves 32, 34, compressor 20, and motor 40 described above. The control system may also be accessed by one or more computing devices 44, 46 via a communications network 48 and/or a wireless communications network 50.

Embodiments of the control system 26 can be implemented with hardware, software, firmware, or a combination thereof and may include a manually operated user interface that receives inputs from an operator or may include automated programming or circuitry. Selected components of an exemplary control system include a controller, processor, or other computing device and memory 52. The control system may also include or be copied with conventional input devices 42 such as knobs, buttons, switches, dials, etc.; inputs for receiving programs and data from external devices; one or more displays; a cellular or other radio transceiver for wirelessly receiving and transmitting data from and to remote devices; a Bluetooth transceiver; a WiFi transceiver; and/or other electronic components. The control system may also implement one or more computer programs for performing some of the functions described herein and may provide a web-based portal that can be accessed by the computing devices 44, 46 and other devices.

The computing devices 44, 46 may be desktop computers, laptop computers, tablet computers, mobile phones, cloud-based systems, or similar devices. Each computing device preferably includes or can access an Internet browser and a conventional Internet connection such as a wireless broadband connection, DSL converter, or ISDN converter so that it can exchange data and instructions with the control system via the communications network 48.

The communications network 48 may be the Internet or any other communications network such as a local area network, a wide area network, or an intranet. The wireless network 50 is capable of supporting wireless communications such as the wireless networks operated by AT&T, Verizon, or T-Mobile. The wireless network 50 may include conventional switching and routing equipment. The communications network 48 and wireless network 50 may also be combined or implemented with several different networks.

The control system 26 and the other computer and communication equipment illustrated and described herein are merely examples of equipment that may be used to implement embodiments of the present invention and may be replaced with other equipment without departing from the scope of the present invention.

Embodiments of the present invention may also comprise one or more computer programs stored in or on computer-readable medium residing on or accessible by the control system 26 and/or the computing devices 44, 46. The computer programs may comprise listings of executable instructions for implementing logical functions in the computers and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 1:
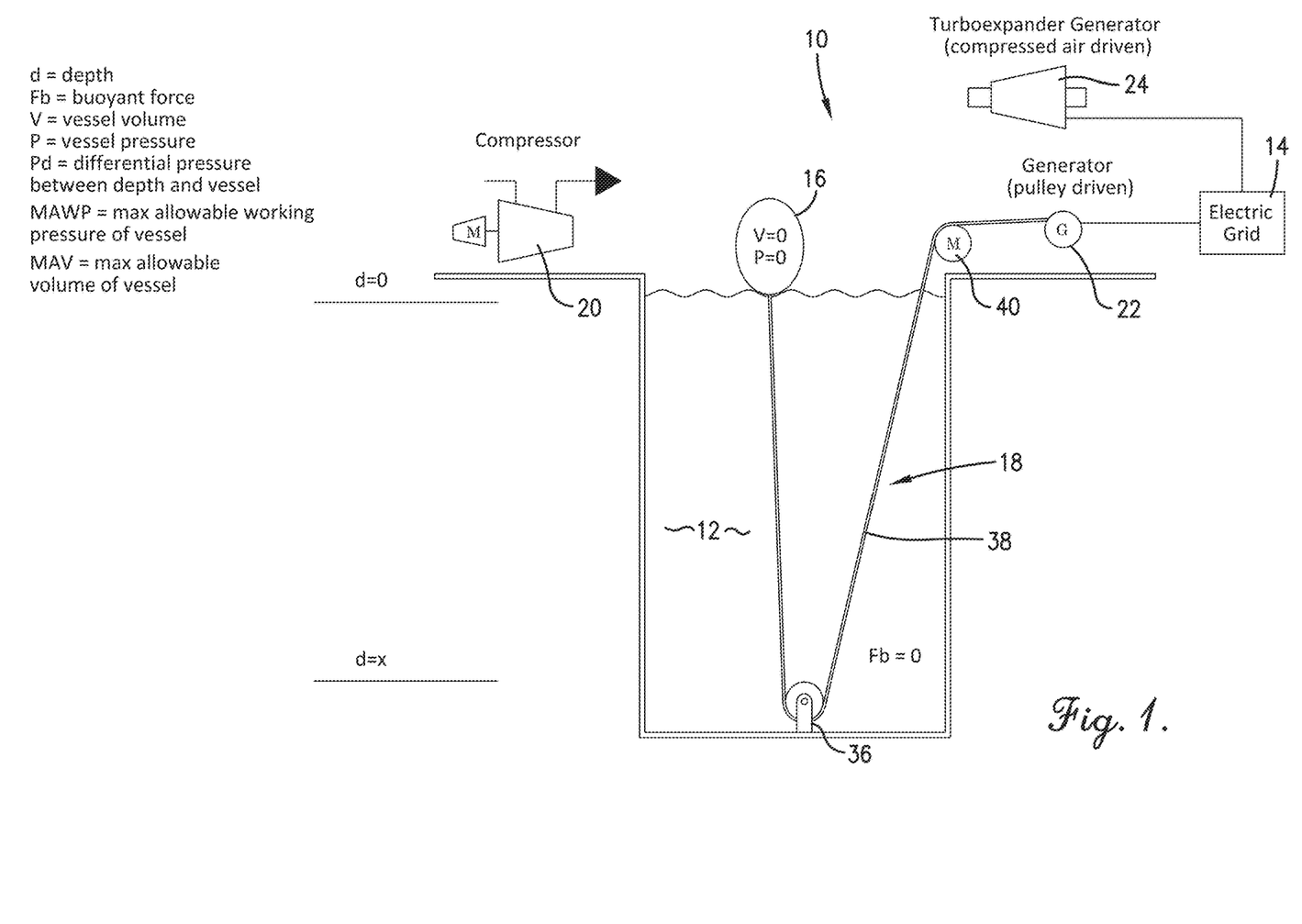
FIG. 1 is a schematic diagram of an energy storage system constructed in accordance with embodiments of the invention with its vessel deflated and at the surface of a body of water.

Operation of the energy storage system 10 will now be described with reference to the schematic diagrams of FIGS. 1 through 4 as well as the flow diagram of FIG. 5. In one embodiment, the vessel 16 is initially deflated as shown in FIG. 1 and step 702 of FIG. 5. The control system 26 then operates the cable system 18 to allow the deflated vessel to sink in the body of water as shown in FIG. 2 and as depicted by step 704 of FIG. 5. Since the vessel is deflated and compressed, little or no energy is required to sink it. While the deflated vessel is held at the bottom of the body of water, the energy storage system 10 is in an "uncharged" state.

Figure 3:
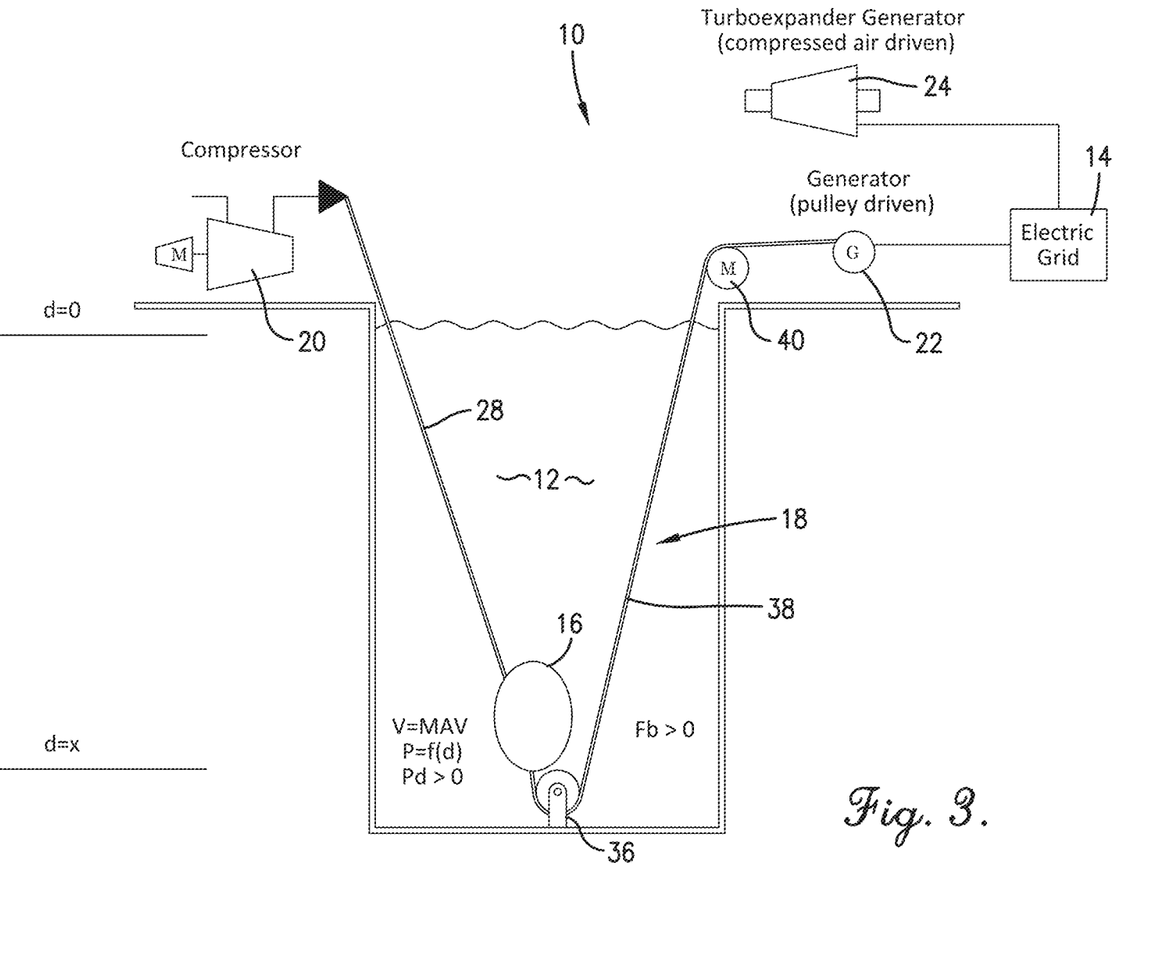
FIG. 3 is another schematic diagram of the energy storage system of FIG. 1 with its vessel inflated and held beneath the body of water.
Figure 5:
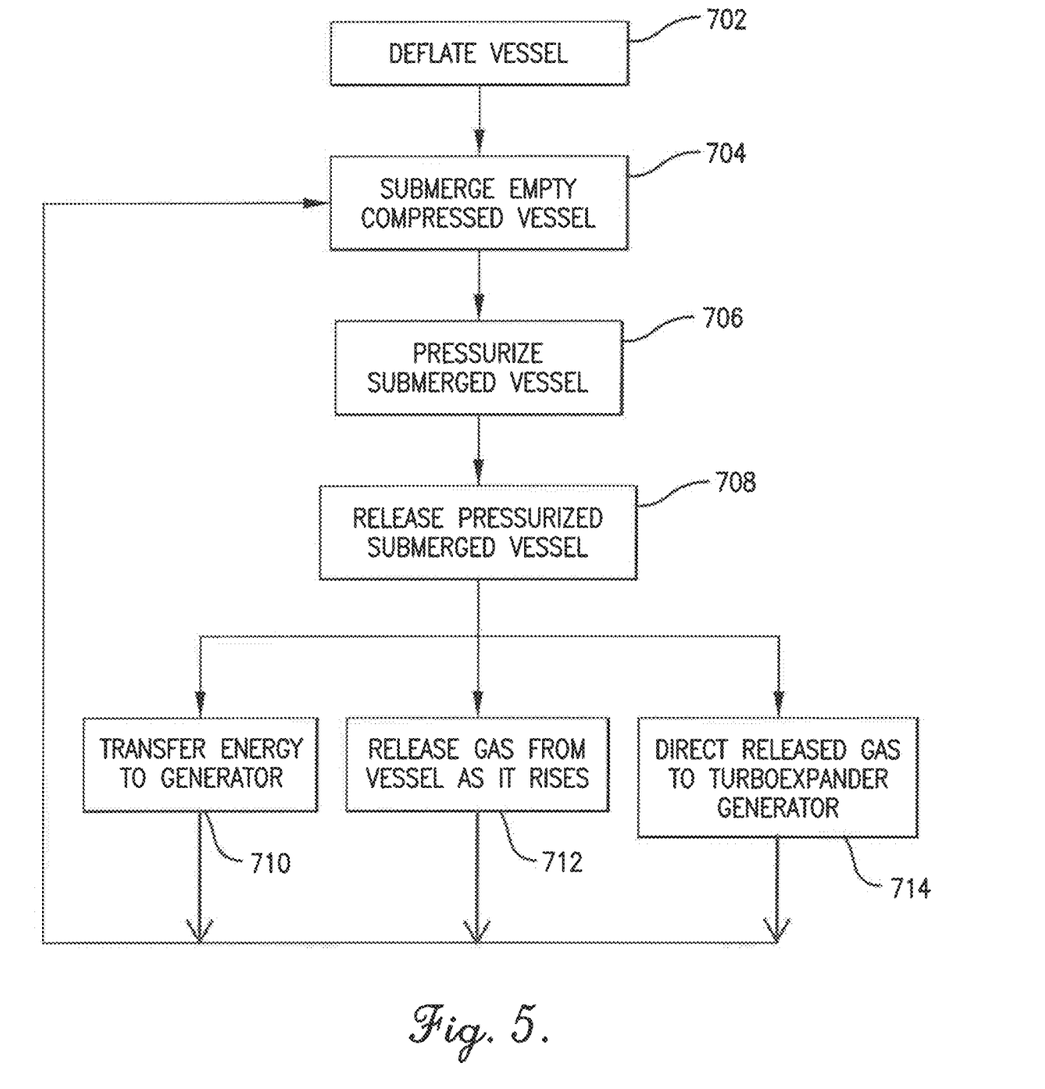
FIG. 5 is a flow diagram showing exemplary steps in a method of the present invention.

When an abundant supply of excess or inexpensive electricity is available, the control system 26 operates the compressor 20 to inflate the vessel 16 with air or other gas as shown in FIG. 3 and step 706 of FIG. 5. As the vessel is inflated and expands, it exerts upward buoyant force and serves as a storage vessel for compressed air. The energy storage system is now in its "charged" state, with both compressed air energy storage and buoyant energy storage. Assuming no leaks, the system can store this energy indefinitely.

When energy is needed, for example at night when little solar energy is available or when the cost of electricity is high, the control system 26 operates the cable system 38 to allow the inflated vessel 16 to rise in the body of water as shown in FIG. 4 and step 708 of FIG. 5. As the inflated vessel rises, the attached cable 38 spins the generator 22 to generate electricity as depicted by step 710 of FIG. 5. The control system also opens the control valve 34 to allow gas to be transferred from the vessel to the turboexpander generator 24 as the vessel rises as depicted in steps 712 and 714 of FIG. 5 to generate more electricity. As the vessel rises, the gas within the vessel is released to maintain pressure nominally consistent with the pressure in the water column. Once the vessel reaches the surface as shown in FIG. 1, it should be near ambient pressure. Any remaining pressure can be released to the expansion turbine or elsewhere and the cycle can be repeated. Because pressure is released from the vessel as it rises, the differential pressure exerted on the vessel is kept low. The vessel only needs to be designed to withstand this differential pressure rather than the total pressure contained.

Embodiments of the present invention are primarily useful as an energy storage system but can also be used as a mixing device (as the vessels rise and fall); a water displacement system to displace large volumes of water and effectively raise water surface levels; and for other related applications.

ADDITIONAL CONSIDERATIONS

The detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The detailed description is, therefore, not to be taken in a limiting sense. The scope of the current invention is defined only by the appended claims, along with the full scope of equivalents to which such claims are entitled.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as a field programmable gate array (FPGA), to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An energy storage system comprising:
   a single flexible and compressible pneumatic vessel that may be inflated with a gas to an expanded state and deflated to a substantially compressed state;
   a cable system attached to the vessel and operable to allow the vessel to sink in a body of water and to permit the vessel to rise toward a surface of the body of water;
   a compressor for inflating the vessel;
   a generator operatively coupled with the cable system for generating electricity when the vessel rises in the body of water; and
   a control system configured to:
      deflate the vessel to its compressed state when the vessel is near the surface of the body of water;
      operate the cable system to allow the vessel to sink in the body of water when the vessel is deflated to its compressed state;
      operate the compressor to inflate the vessel to its expanded state while it is sunk in the body of the water;
      hold the inflated vessel in the expanded state beneath the surface of the body of water; and
      operate the cable system to permit the vessel to rise in the body of water and to operate the generator to generate electricity.

2. The energy storage system of claim 1, further comprising valves coupled with the vessel to allow gas to be added to or expelled from the vessel as controlled by the control system.

3. The energy storage system of claim 2, further comprising a turboexpander generator coupled with the valves for receiving compressed gas from the vessel to generate electricity.

4. The energy storage system of claim 3, wherein the control system is further configured to operate the valves to allow gas to be expelled from the vessel and directed to the turboexpander generator as the cable system allows the vessel to rise in the body of water.

5. The energy storage system of claim 1, wherein the pneumatic vessel is a flexible pneumatic bladder formed of rubber materials.

6. The energy storage system of claim 1, wherein the cable system comprises a pulley anchored beneath the surface of the body of water, a cable trained over the pulley and attached to the vessel, and a motor-driven pulley to permit the vessel to rise toward the surface of the body of water to drive the generator.

7. The energy storage system of claim 3, wherein the control system is further configured to operate the valves and the compressor to deflate the vessel to its compressed state before it is allowed to sink in the body of water.

8. The energy system of claim 1, wherein the control system comprises a manually operated user interface that may receive inputs from an operator to operate the cable system.

9. The energy system of claim 1, wherein the control system is automated to operate the cable system without operator action.

10. A buoyant compressed air energy storage system comprising:
   a single flexible and compressible pneumatic vessel that may be inflated with a gas to an expanded state and deflated to a compressed state;
   a valve coupled with the vessel to allow gas to be added to or expelled from the vessel;
   a cable system attached to the vessel and operable to guide submergence of the vessel in a body of water and to permit the vessel to rise toward a surface of the body of water;
   a generator operatively coupled with the cable system for generating electricity when the vessel rises in the body of water;
   a turboexpander generator coupled with the valve for receiving gas from the vessel to generate electricity as the vessel is deflated;
   a compressor for inflating the vessel; and
   a control system to:
      operate the valve to deflate the vessel to the compressed state while the vessel is near the surface of the body of water to permit the vessel to submerge beneath the surface of the body of water;
      operate the cable system during the submergence of the vessel in the body of water when the vessel is deflated to the compressed state;
      operate the compressor to inflate the vessel when it is submerged in the body of water;
      hold the vessel in the expanded state beneath the surface of the body of water;

operate the cable system to permit the vessel in the expanded state to rise in the body of water and to operate the generator to generate electricity; and operate the valve to allow gas to be expelled from the vessel to the turboexpander generator as the cable system allows the vessel to rise in the body of water.

11. The buoyant compressed air energy system of claim 10, wherein the control system receives instructions from external computing devices.

12. The buoyant compressed air energy storage system of claim 10, wherein the pneumatic vessel is a flexible, thin-walled pneumatic bladder formed of rubber materials.

13. The energy storage system of claim 10, wherein the cable system comprises a pulley anchored beneath the surface of the body of water, a cable trained over the pulley and attached to the vessel, and a motor-driven pulley to permit the vessel to rise toward the surface of the body of water.

14. The energy system of claim 10, wherein the control system comprises a manually operated user interface that may receive inputs from an operator to operate the cable system.

15. The energy system of claim 10, wherein the control system is automated to operate the cable system.

16. A method of storing energy comprising:

operatively coupling a single flexible and compressible pneumatic vessel to a generator;

deflating the pneumatic vessel to a compressed state when the vessel is near a surface of a body of water;

allowing the deflated vessel in the compressed state to sink in the body of water;

inflating the vessel to an expanded state after it has been submerged in the body of water;

holding the inflated vessel submerged in the body of water;

permitting the inflated vessel to rise toward the surface of the body of water to operate the generator and generate electricity when the vessel rises in the body of water.

17. The method of claim 16, further comprising operatively coupling the pneumatic vessel to a valve that allows gas to be added to or expelled from the vessel.

18. The method of claim 17, further comprising operatively coupling the valve to a turboexpander generator.

19. The method of claim 18, further comprising operating the valve to allow gas to be expelled from the vessel and directed to the turboexpander generator as the vessel rises in the body of water.

20. The method of claim 16, further comprising deflating the vessel again to the compressed state and submerging the deflated vessel again after it has risen to the surface of the body of water.

* * * * *